US012632012B2

(12) United States Patent
Xu

(10) Patent No.: US 12,632,012 B2
(45) Date of Patent: May 19, 2026

(54) VISUAL TIMER

(71) Applicant: Jie Xu, Shenzhen (CN)

(72) Inventor: Jie Xu, Shenzhen (CN)

( * ) Notice: Subject to any disclaimer, the term of this patent is extended or adjusted under 35 U.S.C. 154(b) by 0 days.

(21) Appl. No.: 18/884,163

(22) Filed: Sep. 13, 2024

(65) Prior Publication Data

US 2025/0004423 A1 Jan. 2, 2025

Related U.S. Application Data

(63) Continuation of application No. 17/945,105, filed on Nov. 4, 2021, now Pat. No. 12,117,778.

(30) Foreign Application Priority Data

Nov. 4, 2021 (CN) ........................ 202122687711.9

(51) Int. Cl.
*G04G 9/04* (2006.01)
*G04F 1/00* (2006.01)
*G04G 17/04* (2006.01)

(52) U.S. Cl.
CPC ............... *G04G 9/04* (2013.01); *G04F 1/005* (2013.01); *G04G 17/045* (2013.01)

(58) Field of Classification Search
CPC ......... G04G 9/04; G04G 17/045; G04F 1/005
See application file for complete search history.

(56) References Cited

U.S. PATENT DOCUMENTS

| | | | | |
|---|---|---|---|---|
| 4,095,405 A * | 6/1978 | Tanaka | G04G 5/022 | 368/29 |
| 4,435,046 A * | 3/1984 | Nishimura | G04G 9/0082 | 368/242 |
| 4,742,501 A * | 5/1988 | Coster | G04G 9/0082 | 368/240 |
| 6,388,952 B2 * | 5/2002 | Kim | G04G 15/006 | 368/240 |
| 7,009,915 B2 * | 3/2006 | Brewer | G04G 9/0094 | 368/80 |
| 7,505,374 B2 * | 3/2009 | Booty, Jr. | G04G 9/02 | 368/239 |
| 10,203,662 B1 * | 2/2019 | Lin | G01D 5/30 | |
| 10,302,465 B2 * | 5/2019 | Gowreesunker | G01D 5/3473 | |
| 10,303,123 B1 * | 5/2019 | Rogers | G04F 3/022 | |
| 11,762,339 B2 * | 9/2023 | Rogers | G04F 3/08 | 368/108 |
| 2004/0022132 A1 * | 2/2004 | Rund | G04F 10/00 | 368/82 |

(Continued)

*Primary Examiner* — Edwin A. Leon
*Assistant Examiner* — Jason M Collins
(74) *Attorney, Agent, or Firm* — Hemisphere Law, PLLC

(57) ABSTRACT

A visual timer includes a back shell, a PCB board, an encoder, a color display screen, an adjusting knob, a knob sleeve and a lens. The PCB board is arranged on the front of the back shell, the encoder is arranged at the bottom of the front of the PCB board, the color display screen is arranged on the front of the PCB board, the adjusting knob is arranged on the front of the encoder, the knob sleeve is arranged on the front of the adjusting knob, and the lens is arranged on the front of the color display screen. The timer has the characteristics of time visualization, low efficacy and convenient time adjustment by the adjusting knob, and the maximum timing range can be switched to 120 minutes and 60 minutes.

11 Claims, 8 Drawing Sheets

(56) References Cited

U.S. PATENT DOCUMENTS

| | | | | |
|---|---|---|---|---|
| 2005/0243655 | A1* | 11/2005 | McCutcheon | G04F 8/00 368/107 |
| 2006/0245303 | A1 | 11/2006 | Varon | |
| 2008/0129654 | A1* | 6/2008 | Bhavnani | G04C 3/005 345/59 |
| 2008/0253234 | A1* | 10/2008 | Rogers | G04F 10/00 368/240 |
| 2016/0195854 | A1 | 7/2016 | Rubin et al. | |
| 2016/0313593 | A1* | 10/2016 | Grip | G02F 1/133514 |
| 2017/0115639 | A1 | 4/2017 | Rubin et al. | |
| 2017/0248446 | A1* | 8/2017 | Gowreesunker | G05G 9/047 |
| 2017/0254699 | A1* | 9/2017 | Yang | G01D 5/28 |
| 2019/0101869 | A1* | 4/2019 | Lee | G04G 9/0082 |
| 2019/0227217 | A1* | 7/2019 | Lin | G02B 6/0073 |
| 2019/0317454 | A1* | 10/2019 | Holenarsipur | G04C 3/005 |
| 2020/0272108 | A1* | 8/2020 | Grupp | G04G 9/04 |

* cited by examiner

VISUAL TIMER

TECHNICAL FIELD

The present invention relates to the technical field of timers, in particular to a visual timer.

BACKGROUND

A visual timer is a time measuring tool, which is widely used in people's life. The so-called "visual" refers to replacing time with colored color films. In the process of timing, the color films will gradually decrease. When the set time is reached, the timer will remind people that the time is up through alarming, flash screen or vibration. The visual timer is deeply loved by children and students because of its intuitive visual effect and simple operation.

At present, the visual timer disclosed in the market mainly has the following defects:

1. Visual timers with mechanical movement and quartz movement, which are driven by a traditional mechanical gear structure, inevitably have some core defects, such as loud working noise, inaccurate timing, high failure rate, and no pause in the timing process.
2. The color screen visual timer with backlight has the defects of high power consumption and high cost.
3. due to the facts that not enough numbers lead to the need for close-range viewing, and the viewing angle limitation of the liquid crystal display requires viewing the displayed numbers at angles in a fixed range, it is inconvenient and intuitive to provide information and check information in real time during the running process of the timer. If the indoor light is dim or the distance is far away, the numbers cannot be clearly seen and the running status of the timer cannot be checked at any time for the existing household timers.
4. At present, the timing range of the visual timer on the market is 60 minutes. For junior high school, senior high school and postgraduate students, its time range is too small, because their examination time is 90 or 120 minutes.

SUMMARY

The purpose of the present invention is to provide a visual timer to solve the problems mentioned in the above background.

To achieve the above purpose, the present invention provides the following technical solution: visual timer, including a back shell (1), a PCB (2), an encoder (3), a color display screen (4), an adjusting knob (301), a knob sleeve (302) and a lens (5), characterized in that the PCB (2) is arranged on the front of the back shell (1), the encoder (3) is arranged at the bottom of the front of the PCB (2), and the color display screen (4) is arranged on the front of the PCB (2), wherein the color display screen (4) comprises an upper glass substrate (41) and a lower glass substrate (42); the bottom of the lower glass substrate (42) is provided with a lower polarizer (43), and the bottom of the lower polarizer (43) is provided with a color film (44); the color film (44) is provided with a silk screen printing region (441), and the bottom of the color film (44) is provided with a film (45); the top of the lower glass substrate (42) is provided with a lower alignment layer (46); the adjusting knob (301) is arranged on the front of the encoder (3), the knob sleeve (302) is arranged on the front of the adjusting knob (301), and the lens (5) is arranged on the front of the color display screen (4).

Preferably, the back of the color display screen (4) is provided with a reflective coating, and the bottom of the color display screen (4) is provided with a reflective film.

Preferably, a volume icon (401) is arranged at the upper left of the front of the color display screen (4), and a low-power reminder icon (402) is arranged at the upper right of the front of the color display screen (4).

Preferably, a digital scale (403) is arranged in the center of the front of the color display screen (4), the center of the digital scale (403) is provided with a digital region (404), and the centers of the digital region (404) and the digital scale (403) are provided with a visual region (405).

Preferably, the middle of the color display screen (4) is provided with a time display region (13); time display region (13) comprises a minute display (14) and a second display (15); the outer ring of the time display region (13) is provided with a color timing lamp (16), and the periphery of the color timing lamp (16) is provided with a countdown pointer and a numerical value (17).

Preferably, the upper part of the minute display (14) is provided with an M mark, which is minute counting, and the upper part of the second display (15) is provided with an S mark, which is second counting.

Preferably, the numerical countdown pointer and the numerical value (17) are provided with a number every five values.

Preferably, an indicator lamp (19) is arranged below the time display region (13), and the indicator lamp (19) is a triangular indicator lamp, which shows an upward triangle during counting up and a downward triangle during counting down.

Preferably, the color timer lamp (16) converts the numbers of the timer into vivid patterns; the patterns gradually increase clockwise with the increase of the timing time during counting up, and gradually decrease counterclockwise with the decrease of the timing time during counting down, so as to achieve a visual effect by replacing the digital display with an intuitive and clear visual effect.

Preferably, a start pause button (6) is arranged at the lower right of the front of the color display screen (4), and a volume adjustment button (7) is arranged at the lower left of the front of the color display screen (4).

Preferably, the back of the back shell (1) is provided with a battery running device (8), and the top of the battery running device (8) is provided with a charging port (9).

Preferably, the color film (44) is silk-screened with but not limited to a silk screen printing region (441) on a surface region thereof by silk screening.

Preferably, the top of the upper glass substrate (41) is provided with an upper polarizer (47), and the bottom of the upper glass substrate (41) is provided with an upper alignment layer (8); a liquid crystal layer (49) is arranged between the upper alignment layer (48) and the lower alignment layer (46).

Preferably, the film (45) is a reflective film.

Compared with the prior art, the invention has the following advantages.

1. According to the visual timer, the bottom of the encoder is attached to the PCB board by the cooperation of the encoder, the PCB board and the adjusting knob, and communication with the CPU is realized by a wiring. The adjusting knob penetrates through the face shell and the lens, and the encoder is driven to rotate by rotating the adjusting knob. There is a rotating disc inside the encoder with several transparent and opaque windows. A photoelectric receiver collects the intermittent light beams, so that the light pulses are converted into electric pulses. Then the signals are transmitted to the CPU by an electronic output circuit, and the CPU processes and outputs the signals. Time is increased in case of clockwise rotation and while time is reduced in case of counterclockwise rotation, which makes the adjustment mode simpler.

2. According to the visual timer, through the cooperation of the start pause button, the visual region and the digital region, the start pause button is pressed to start timing. In the counting up process, the color block of the visual region gradually increases from 0. The digital region synchronizes from 00:00, and an alarm is given when it reaches the maximum range. During the counting down process, the color block in the visual region gradually disappears from the set time, and the digital regions decrease synchronously from the set time. When the timer is finished, an alarm will be given. After the alarm is suspended, the time initially set by the user will be displayed by default.
3. The timer adopts a color display screen, which is an optimization and upgrade of the manufacturing process of the traditional monochrome LCD screen, so it can completely inherit the mature manufacturing process of the monochrome LCD screen, can be quickly produced in a large scale, and inherit the advantages of low cost and wide viewing angle of the monochrome LCD screen. Because the timer uses natural light as the light source, it also has the advantage of low power consumption.

Figure 1:
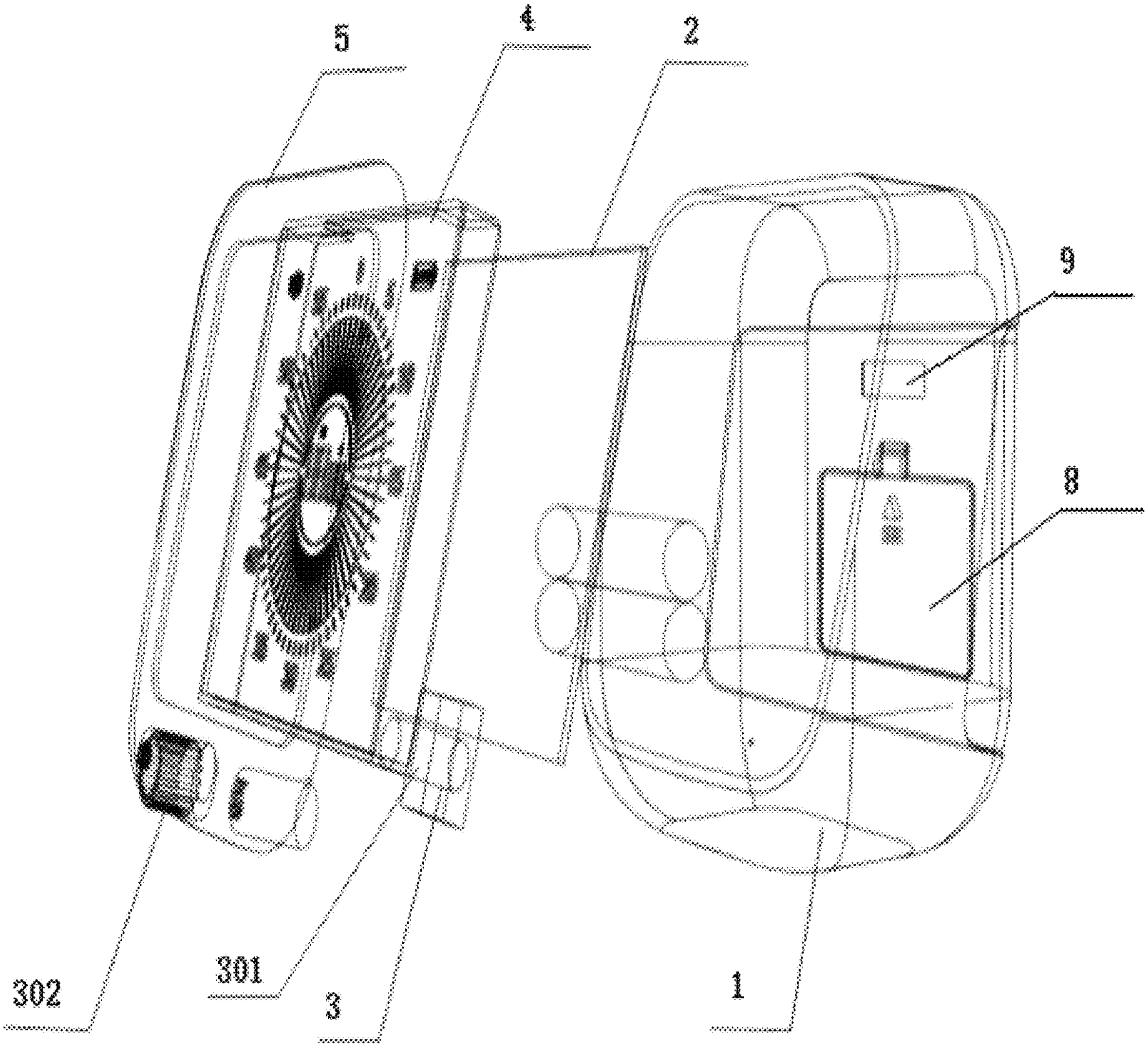
FIG. 1 is a schematic structural diagram of the present invention.

In the drawings: 1. Back shell; 2. PCB board; 3. Encoder; 4. Color display screen; 301. Adjusting knob; 302. Knob sleeve; 5. Lens; 401. Volume icon; 402. Low-power reminder icon; 403. Digital scale; 404. Digital region; 405. Visual region; 6. Start pause button; 7. Adjustment button; 8. Battery running device; 9. Charging port; 41. Upper glass substrate; 42. Lower glass substrate; 43. Lower polarizer; 44. Color film; 441. Silk screen printing region; 45. Film; 46. Lower alignment layer; 47. Upper polarizer; 48. Upper alignment layer; 49. Liquid crystal layer; 13. Time display region; 14. Minute display; 15. Seconds display; 16. Color timing lamp; 17. Countdown pointer and numerical value; 18. Side frame; 19. Indicator lamp.

DESCRIPTION OF EMBODIMENTS

The technical solution in the embodiments of the present invention will be clearly and completely described below with reference to the drawings in the embodiments of the present invention. Obviously, the described embodiments are only part of the embodiments of the present invention, but not all of them. Based on the embodiment of the present invention, all other embodiments obtained by those skilled in the art without creative labor are within the scope of the present invention.

Figure 2:
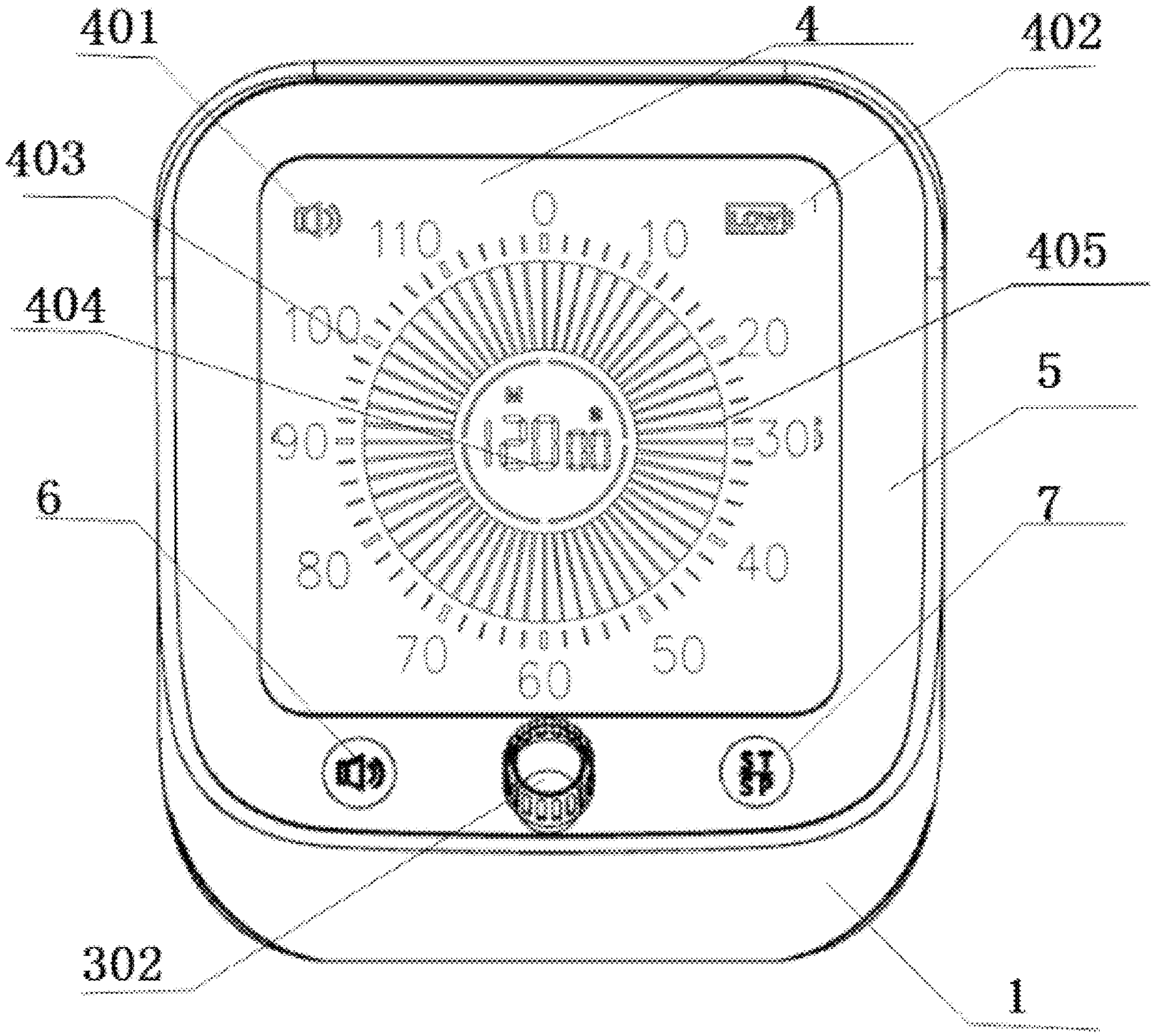
FIG. 2 is a front view of the present invention.

Referring to FIGS. 1-2, the present invention provides a technical solution: a visual timer includes a back shell 1, a PCB board 2, an encoder 3, a color display screen 4, an adjusting knob 301, a knob sleeve 302 and a lens 5. The PCB board 2 is arranged on the front of the back shell 1. The encoder 3 is arranged at the bottom of the front of the PCB board 2. The color display screen 4 is arranged on the front of the PCB board 2. The adjusting knob 301 is arranged on the front of the encoder 3. The knob sleeve 302 is arranged on the front of the adjustment knob 301. The lens 5 is arranged on the front of the color display screen 4.

Figure 3:
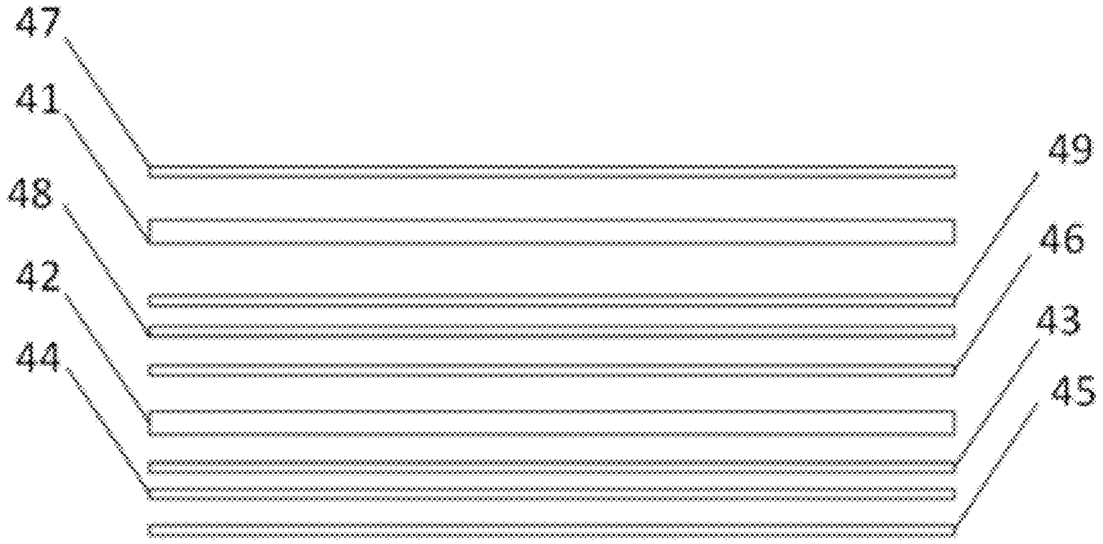
FIG. 3 is a structural diagram of the color display screen of the present invention.
Figure 4:
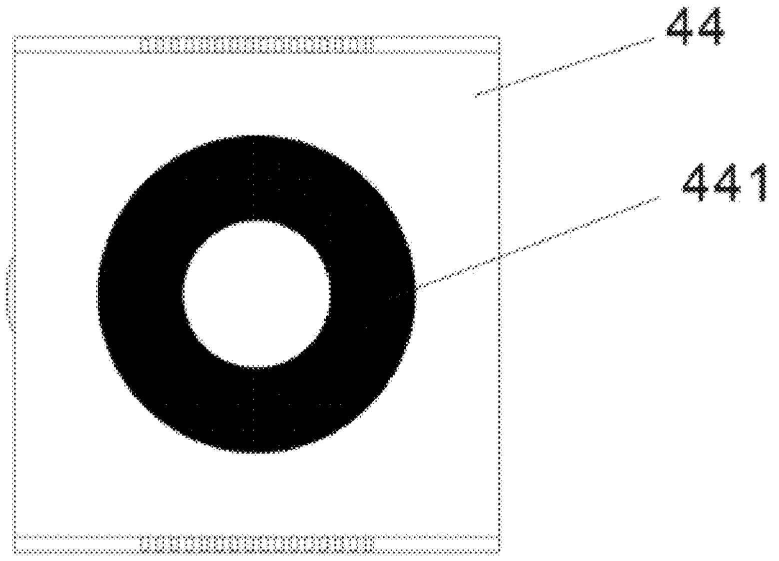
FIG. 4 is a silk screen printing diagram of the color film of the color display screen of the present invention.
Figure 5:
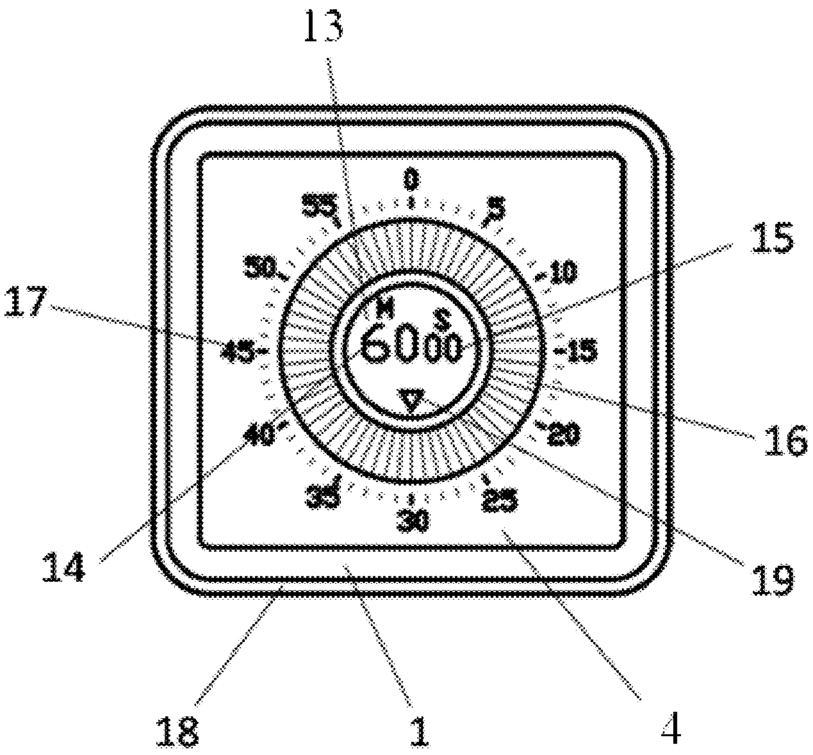
FIG. 5 is a structural diagram of a visual timer according to another embodiment of the present invention.
Figure 6:
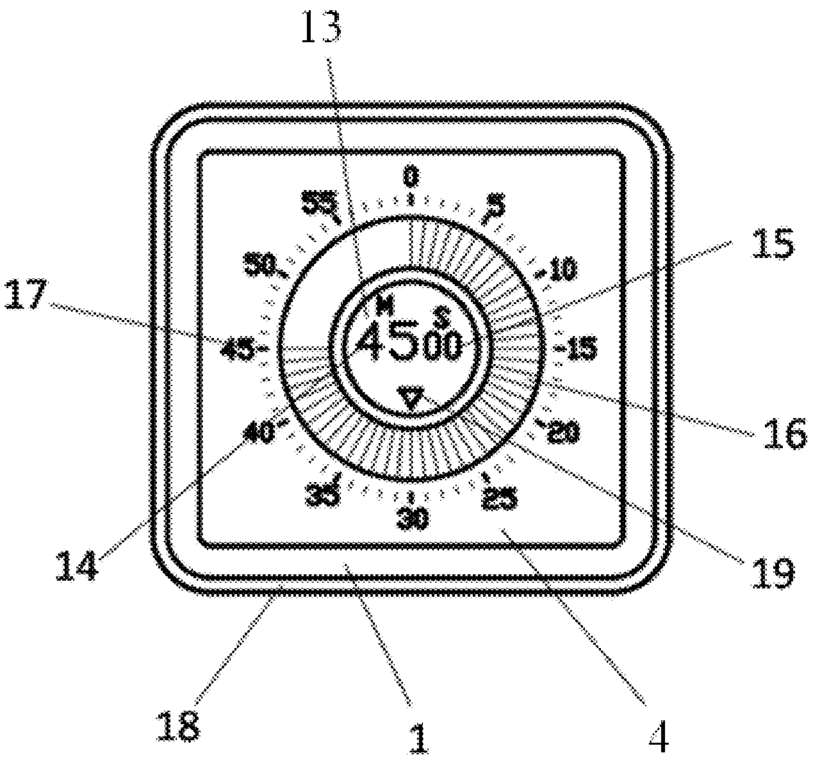
FIG. 6 is a schematic diagram when the timer shown in FIG. 4 counts 45 minutes.
Figure 7:
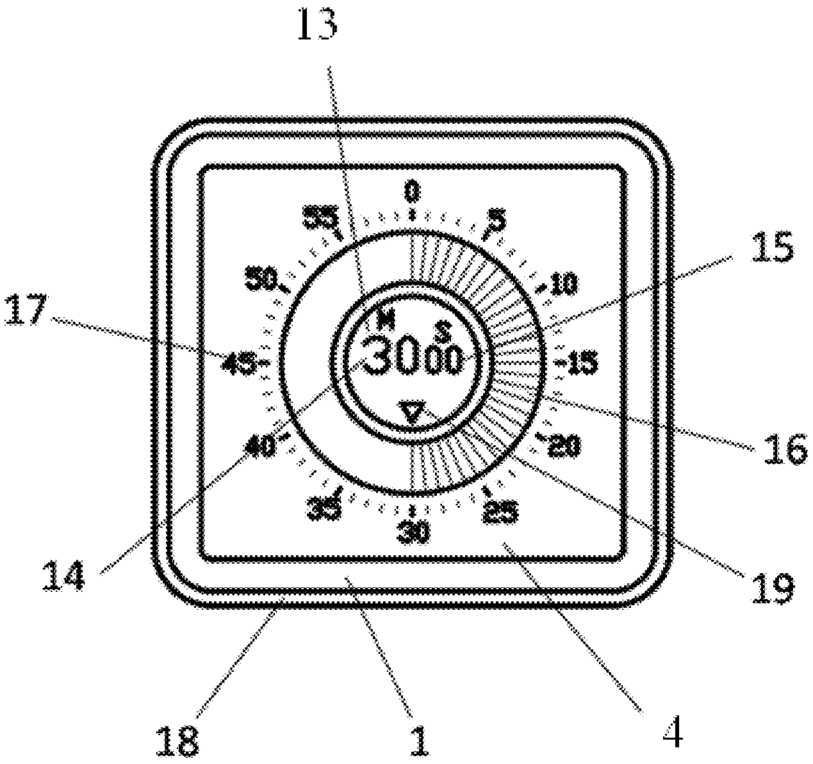
FIG. 7 is a schematic diagram when the timer shown in FIG. 4 counts 30 minutes.
Figure 8:
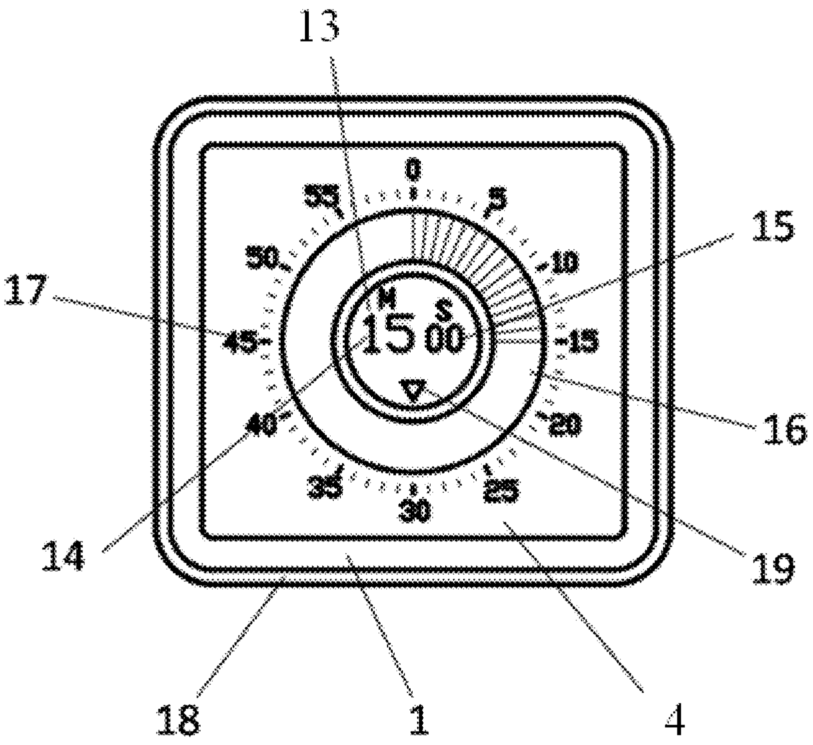
FIG. 8 is a schematic diagram when the timer shown in FIG. 4 counts 15 minutes.
Figure 9:
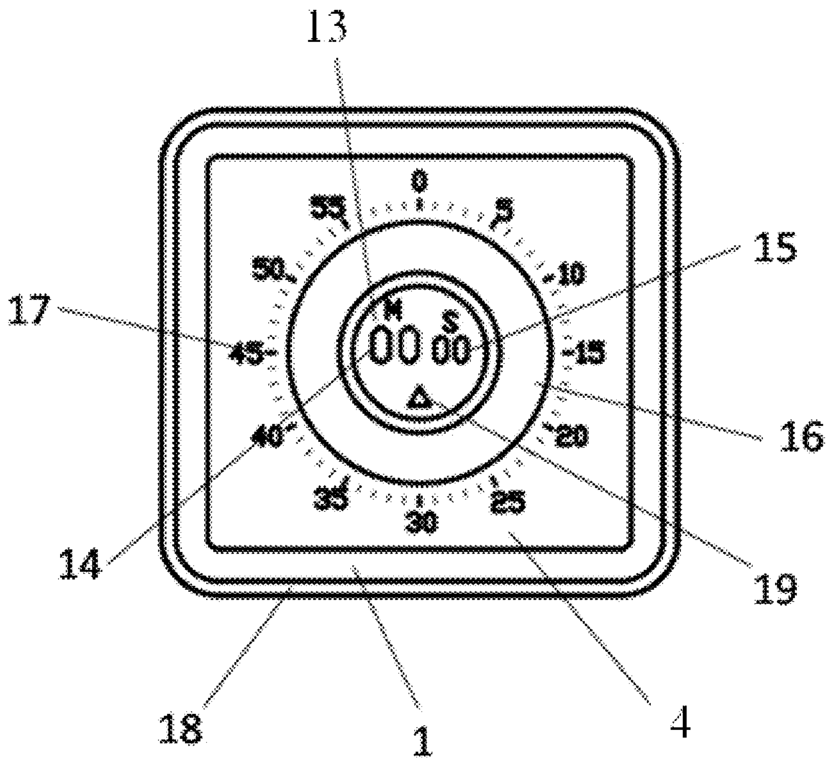
FIG. 9 is a schematic diagram of the timer shown in FIG. 4 when counting is completed.

Referring to FIGS. 3-4, the color display screen 4 includes an upper glass substrate 41 and a lower glass substrate 42. The bottom of the lower glass substrate 42 is provided with a lower polarizer 43, and the bottom of the lower polarizer 43 is provided with a color film 44. The bottom of the color film 44 is provided with a film 45, and the top of the lower glass substrate 42 is provided with a lower alignment layer 6. The color film 44 is silk-screened with but not limited to a silk screen printing region 441 on a surface region thereof by silk screening. The top of the upper glass substrate 41 is provided with an upper polarizer 7, and the bottom of the upper glass substrate 41 is provided with an upper alignment layer 8. A liquid crystal layer 9 is arranged between the upper alignment layer 8 and the lower alignment layer 6, and the film 45 is a reflective film.

Working principle: the designated color is attached to the region to be displayed on the lower polarizer 43, that is, the silk screen printing region (441) silk-printed on the color film 44. After the display screen is powered on, the voltage applied to the liquid crystal molecules is adjusted to control the arrangement of the liquid crystal molecules. Herein, the way of controlling the arrangement of the liquid crystal molecules is also used in the prior art, that is, the upper glass substrate and the lower glass substrate, which are special conductive materials. In the LCD, it is mainly used to etch the required display pattern. When two ITO conductive layers are energized, the overlapping part will form an electric field, but the part without ITO conductive layer will not form an electric field. Under the action of the electric field, the liquid crystal will change, so that the light can directly pass through to control the light transmission. When the natural light penetrates through the upper polarizer 7 and the lower polarizer 43, the upper glass substrate 1, the liquid crystal layer 9 and the lower glass substrate 42, the light will be reflected by the film 45. The reflected light directly passes through the color film 44, then the display content of the screen display region corresponding to the silk screen printing color region on the color film 44 will be consistent with the specified color attached. When different colors are attached to different regions of the color film, the display content of the screen will become different color combinations, thus achieving a color screen effect.

In one embodiment, a volume icon 401 is arranged at the upper left of the front of the color display screen 4, and a low-power reminder icon 402 is arranged at the upper right of the front of the color display screen 4.

In this embodiment, the volume icon 401 can display the current volume situation, and when the power is low, the low-power reminder icon 402 flashes to remind consumers that the power is too low.

The center of the front of the color display screen 4 is provided with a digital scale 403, the center of the digital scale 403 is provided with a digital region 404, and the centers of the digital region 404 and the digital scale 403 are provided with a visual region 405.

In this embodiment, the visual region 405 is composed of several equal color blocks with eye-catching colors, and the color blocks will increase or decrease continuously with the timing process. The area of the displayed color block can visually indicate the remaining time proportion, and its periphery corresponds to a digital scale 403, and the number determines the maximum timing range. There is a digital region 404 in the color block, which counts synchronously with the visual region 405 to achieve a visual effect. When the counting time is 120 minutes, the number region 404 will display the number "120"; When the counting time is 90 minutes, the number region 404 will display the number "90" minutes. When the timer is off, the digital region 404 will be automatically converted into a clock.

A start pause button 6 is arranged at the lower right of the front of the color display screen 4, and a volume adjustment button 7 is arranged at the lower left of the front of the color display screen 4.

In this embodiment, in the process of timing, you can click the start pause button 6 to start or pause the timing. The volume adjustment button 7 can be used to adjust the volume. Wherein, the back of the back shell 1 is provided with a battery running device 8, and the top of the battery running device 8 is provided with a charging port 9.

In this embodiment, when the low-power reminder icon 402 flashes, it can be charged through the charging port 9, or it can be used by inserting a battery into the battery running device 8.

Referring to FIGS. 5-9, another embodiment of the present application discloses a visual timer, the layout of which is similar to the time display region of the visual timer in the first embodiment. The visual timer in this embodiment includes a back shell 1, the middle of which is provided with a color display screen 4. The middle of the color display screen 4 is provided with a time display region 13, which includes a minute display 14 and a second display 15. The outer ring of the time display region 13 is provided with a color timer lamp 16, and the periphery of the color timer lamp 16 is provided with a countdown pointer and a numerical value 17.

Wherein, the upper part of the minute display 14 is provided with an M mark, that is, minute counting; the upper part of the second display 15 is provided with an S mark, that is, second counting; the numerical countdown pointer and the numerical value 17 are provided with a number every five values; an indicator lamp 19 is arranged below the time display region 13, and the indicator lamp 19 is a triangular display lamp. It can be understood that the timing range of the visual timer in this embodiment can be set to 120 minutes as well as 60 minutes selectively, and the specific timing range can be selected according to the actual needs.

In this embodiment, before the timer is used, it is first necessary to set a target timing time by rotation, and then click "START" to start the countdown. When the countdown is completed, there are sound alarms and backlight flashing alarms. Its use effect is the same as that of the existing digital timer, except that the color display screen 4 converts the timer's numbers into bright patterns, and replaces digital display with intuitive and clear visual effects. It overcomes the defect that the existing liquid crystal display timer cannot be clearly seen in dim light in use environment. The timing numerical values of the color display 4 and the time display region 13 are larger than the previous numerical values, which overcomes the defect that the existing liquid crystal display digital timer cannot be clearly viewed from a long distance because of its small screen. According to the visual timer, the timing progress can be visually seen due to the bright color timer lamp 16, which solves the defect that the existing liquid crystal display timer cannot allow viewing at a 180-degree angle.

Specifically, before the timer is used, it is first necessary to set a target timing time by rotation, and then click "START" to start the countdown. The screen has bright patterns, and the numbers of the timer are synchronized to start the countdown. The color display screen 4 converts the numbers of the timer into bright patterns, thus achieving a visual effect. The digital display is replaced with an intuitive and clear visual effect, thus solving the defect that the existing liquid crystal display timer cannot be clearly seen in the dim environment. Moreover, the timing numerical values of the color display screen 4 and the time display region 13 are larger than the previous numerical values, therefore the defect that the current digital timer with a liquid crystal display cannot be clearly viewed from a long distance due to the small screen is overcome. The timing progress can be intuitively seen in the visual timer due to the bright color timing lamp 16. During the process of counting up, the indicator lamp 19 at this time is an upward-pointing triangular arrow, the color timer lamp 16 rotates clockwise and gradually increases. When the countdown is needed, the indicator lamp 19 is converted into a downward-pointing triangular display lamp, and then the timing is carried out again. For the display of the color blocks, they gradually disappear counterclockwise, which overcomes the defect that the existing liquid crystal display timer cannot allow viewing at an angle of 180 degrees.

The working principle of the visual timer disclosed by the invention is as follows: the bottom of the encoder 3 is attached to the PCB board 2, and d communication with the CPU is realized by a wiring. The adjusting knob 301 penetrates through the face shell and the lens 5; the knob sleeve 302 is sleeved on the adjusting knob 301 of the encoder 3, and the encoder 3 is driven to rotate by rotating the adjusting knob 301. The encoder 3 is a sensor that converts a mechanical displacement into an electrical signal by measuring physical quantities such as speed, position, speed or angle. It can be divided into two types: incremental type and absolute type. An incremental encoder 3 generates pulse signals, and the speed, length or position can be measured by the number of pulses. For an absolute encoder 3, each position corresponds to a digital value of a displacement. There is a rotating disk inside the encoder 3 with several transparent and opaque windows. A photoelectric receiver collects the intermittent light beams, so that the light pulses are converted into electric pulses. Then the signals are transmitted to the CPU by a electronic output circuit, which processes and outputs the signals. The time is increased for clockwise rotation and the time is decreased for counterclockwise rotation. The numbers of the middle digital region 404 (corresponding to the time display region 13 in embodiment 2) and the color blocks of the visual region 405 will increase or decrease synchronously. The start pause button 6 is pressed to start timing. During the timing process, the color blocks in the visual region 405 gradually increase from 0, and the digital region 404 synchronizes from 00:00. An alarm is given when it reaches the maximum range. During the countdown process, the color blocks in the visual region 405 gradually disappear from the set time, and the digital region 404 decreases synchronously from the set time. When the timer is finished, an alarm will be given. After the alarm is suspended, the time initially set by the user will be displayed by default. A color coating is attached to the back of the color display screen 4, and a reflective film is attached to the bottom of the color coating. When natural light irradiates into the color display screen 4, the light is reflected by the reflective film at the bottom and passes through the color coating on the back of the color display screen 4, so that the display region of the color display screen 4 displays the same color as the color coating, thereby achieving the principle of color display. The volume icon 401 can display the current volume situation, and when the power is low, the low-power reminder icon 402 will flash to remind consumers that the power is low. The visual region 405 is composed of several equal color blocks with eye-catching colors, and the color blocks will increase or decrease continuously with the timing process. The area of the displayed color blocks can visually identify the remaining time proportion, and its periphery is corresponding to a digital scale 403, which determines the maximum timing range. There is a digital region 404 in the color block, which counts synchronously with the visual region 405 to achieve a visual effect. When the counting time is 120 minutes, the number region 404 will display the number "120"; when the counting time is 90 minutes, the number region 404 will display the number "90" minutes. When the timer is off, the digital region 404 will be automatically converted into a clock. In the process of timing, the start pause button 6 can be pressed to start or pause the timing. The volume adjustment button 7 can adjust the volume. When the low-power reminder icon 402 flashes, the timer can be charged through the charging port 9, or a battery can be inserted into the battery running device 8 for use.

Although the embodiments of the present invention have been shown and described, it will be understood by those skilled in the art that many changes, modifications, substitutions and variations can be made to these embodiments without departing from the principle and spirit of the present invention, and the scope of the present invention shall be defined by the appended claims and the equivalents thereof.

What is claimed is:

1. A visual timer, comprising a back shell, a PCB (2) arranged on a front side of the back shell, and a color display screen (4) arranged on a front side of the PCB facing away from the back shell, wherein a front of the color display screen (4) is provided with a time display region (13), and a color timing lamp (16) is arranged around a peripheral of the time display region (13); wherein the color display screen (4) further comprises an upper glass substrate (41) and a lower glass substrate (42), a rear side of the lower glass substrate (42) facing away from the upper glass substrate (41) is provided with a lower polarizer (43).

2. The visual timer according to claim 1, wherein the color display screen (4) comprises a color film (44), and the color film (44) is provided with a silk screen printing region.

3. The visual timer according to claim 2, wherein the color film (44) is arranged at a rear side of the lower polarizer (43) facing away from the lower glass substrate (42), a rear side of the color film (44) facing away from the lower polarizer (43) is provided with a film (45), and a front side of the lower glass substrate (42) facing away from the lower polarizer (43) is provided with a lower alignment layer (46).

4. The visual timer according to claim 1, wherein the color timer lamp (16) is configured to display patterns that gradually increase or decrease, corresponding to increase or decrease in time; and the patterns gradually increase clockwise with the increase of the timing time during counting up, and gradually decrease counterclockwise with the decrease of the timing time during counting down.

5. The visual timer according to claim 1, further comprising an encoder (3) and an adjusting knob (301), wherein the PCB (2) is connected to the encoder (3), and the adjusting knob (301) is arranged on the front of the encoder (3).

6. The visual timer according to claim 1, wherein a volume icon (401) is arranged at an upper left of the front of the color display screen (4), and a low-power reminder icon (402) is arranged at the upper right of the front of the color display screen (4).

7. The visual timer according to claim 1, wherein a digital scale (403) is arranged in a center of the front of the color display screen (4), a center of the digital scale (403) is provided with a digital region (404), and a visual region (405) is provided between the digital region (404) and the digital scale (403).

8. The visual timer according to claim 1, wherein the time display region (13) comprises a minute display (14) and a second display (15), and a periphery of the color timing lamp (16) is provided with a countdown pointer and a numerical value (17).

9. The visual timer according to claim 8, wherein an upper part of the minute display (14) is provided with an M mark, which is minute counting, and an upper part of the second display (15) is provided with an S mark, which is second counting.

10. The visual timer according to claim 8, wherein the countdown pointer and the numerical value (17) are provided with a number every five values.

11. The visual timer according to claim 1, wherein an indicator lamp (19) is arranged below the time display region (13), and the indicator lamp (19) is a triangular indicator lamp, which shows an upward triangle during counting up and a downward triangle during counting down.

* * * * *